(12) United States Patent
Matsui

(10) Patent No.: US 9,480,934 B2
(45) Date of Patent: Nov. 1, 2016

(54) CRYOPUMP SYSTEM, AND METHOD OF OPERATING THE SAME, AND COMPRESSOR UNIT

(71) Applicant: SUMITOMO HEAVY INDUSTRIES, LTD., Tokyo (JP)

(72) Inventor: Takaaki Matsui, Tokyo (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 344 days.

(21) Appl. No.: 13/788,858

(22) Filed: Mar. 7, 2013

(65) Prior Publication Data

US 2013/0232999 A1 Sep. 12, 2013

(30) Foreign Application Priority Data

Mar. 7, 2012 (JP) .................. 2012-050725

(51) Int. Cl.
*F25B 45/00* (2006.01)
*B01D 8/00* (2006.01)
*F25B 41/00* (2006.01)
*F04B 39/04* (2006.01)
(Continued)

(52) U.S. Cl.
CPC ............... *B01D 8/00* (2013.01); *F04B 37/08* (2013.01); *F25B 9/14* (2013.01); *F25B 45/00* (2013.01); *F25B 2345/002* (2013.01); *F25B 2345/003* (2013.01); *F25B 2345/004* (2013.01); *F25B 2600/05* (2013.01)

(58) Field of Classification Search
CPC ........ F04B 37/08; F04B 37/085; B01D 8/00; F25B 2345/002; F25B 2345/003; F25B 2345/004; F25B 2600/05

USPC ................... 62/55.5, 149; 417/228
See application file for complete search history.

(56) References Cited

U.S. PATENT DOCUMENTS

| 3,307,370 A * | 3/1967 | Klipping .................... 62/210 |
| 6,530,237 B2 * | 3/2003 | Morse ................. F25B 45/00 62/149 |
| 7,263,839 B2 * | 9/2007 | Overweg ............. F25D 29/001 62/259.2 |

(Continued)

FOREIGN PATENT DOCUMENTS

| JP | H09-317640 A | 12/1997 |
| JP | H1137579 A * | 2/1999 ............ F25B 45/00 |

(Continued)

OTHER PUBLICATIONS

Translation of Japanese Patent Document JPH1137579A, entitled Translation-JPH1137579A, translated Aug. 28, 2015.*

Primary Examiner — M. Alexandra Elve
Assistant Examiner — Paul Alvare
(74) Attorney, Agent, or Firm — Michael Best & Friedrich LLP

(57) ABSTRACT

A cryopump system includes a cryopump configured to perform a preparatory operation including a cooldown from a room temperature to a cryogenic temperature and to perform a vacuum pumping operation at the cryogenic temperature, a compressor unit of a working gas for the cryopump, a gas line connecting the cryopump and the compressor unit, a gas volume adjuster configured to increase a quantity of the working gas in the gas line during the vacuum pumping operation in comparison with that during the preparatory operation, and a control device configured to control the compressor unit so as to provide a pressure control for the gas line.

13 Claims, 9 Drawing Sheets

(51) Int. Cl.
*F25B 9/14* (2006.01)
*F04B 37/08* (2006.01)

(56) References Cited

U.S. PATENT DOCUMENTS

| | | | | |
|---|---|---|---|---|
| 2003/0014985 A1* | 1/2003 | Dresens | ................... | B01D 8/00 |
| | | | | 62/149 |
| 2009/0158752 A1* | 6/2009 | Clayton et al. | ..................... | 62/6 |
| 2009/0165470 A1* | 7/2009 | Aoki et al. | ..................... | 62/55.5 |
| 2009/0282842 A1* | 11/2009 | Koyama | ........................... | 62/56 |
| 2011/0162959 A1* | 7/2011 | Okada | ..................... | F04B 37/08 |
| | | | | 204/192.1 |

FOREIGN PATENT DOCUMENTS

| | | |
|---|---|---|
| JP | 2000-266416 A | 9/2000 |
| JP | 2009-150645 A | 7/2009 |
| JP | 2009-275579 A | 11/2009 |

* cited by examiner

CRYOPUMP SYSTEM, AND METHOD OF OPERATING THE SAME, AND COMPRESSOR UNIT

BACKGROUND OF THE INVENTION

1. Field of the Invention

The present invention relates to a cryopump system and a method of operating the same, and a compressor unit suitable for use in the cryopump system.

2. Description of the Related Art

Refrigerating systems including a cryogenic refrigerator and a compressor for supplying compressed gases to the refrigerator are known. When a reduction in a refrigerating performance is tolerated, the gas is allowed to flow into a buffer volume to reduce a static charge pressure of a gas circuit of the compressor. When a high refrigerating power is demanded again, the gas is discharged from the buffer volume to restore the static charge pressure. This allows the static charge pressure to be changed, while keeping the compressor operating at a constant speed. Electric power consumption is thus reduced when a reduction in the refrigerating performance is tolerated.

SUMMARY OF THE INVENTION

According to an aspect of the present invention, a cryopump system includes: a cryopump configured to perform a preparatory operation including a cooldown from a room temperature to a cryogenic temperature and to perform a vacuum pumping operation at the cryogenic temperature; a compressor of a working gas for the cryopump; a gas line connecting the cryopump and the compressor; a gas volume adjuster configured to increase a quantity of the working gas in the gas line during the vacuum pumping operation in comparison with that during the preparatory operation; and a control device configured to control the compressor so as to provide a pressure control for the gas line.

Another aspect of the present invention is a method of operating a cryopump system including a cryopump and a compressor for the cryopump. This method includes increasing a quantity of a working gas circulating between the cryopump and the compressor for starting a vacuum pumping operation of the cryopump, and controlling the compressor for a pressure control of the working gas circulating between the cryopump and the compressor.

Another aspect of the present invention is a compressor unit of a working gas for a cryogenic device. This compressor unit includes: a compressor; a gas volume adjuster configured to adjust a quantity of the working gas circulating between the cryogenic device and the compressor; and a controller configured to control the compressor so as to provide a pressure control of the working gas. The gas volume adjuster adjusts the quantity of the working gas for a normal operation of the cryogenic device from an initial gas quantity for a preparatory operation of the cryogenic device to a normal gas quantity that is increased from the initial gas quantity. The preparatory operation includes a cooling from a room temperature to a cryogenic temperature.

A cryopump system according to another aspect of the present invention includes: a cryopump; a compressor; a gas line connecting the cryopump and the compressor; and a gas volume adjuster configured to reduce a quantity of a working gas in the gas line during a regeneration of the cryopump in comparison with that during a vacuum pumping operation of the cryopump.

It should be noted that any combination of the components described above and any replacement of the components and descriptions of the present invention between methods, systems, programs, and the like are valid as an aspect of the present invention.

BRIEF DESCRIPTION OF THE DRAWINGS

Embodiments will now be described, byway of example only, with reference to the accompanying drawings which are meant to be exemplary, not limiting, and wherein like elements are numbered alike in several Figures, in which.

DETAILED DESCRIPTION OF THE INVENTION

Figure 1:
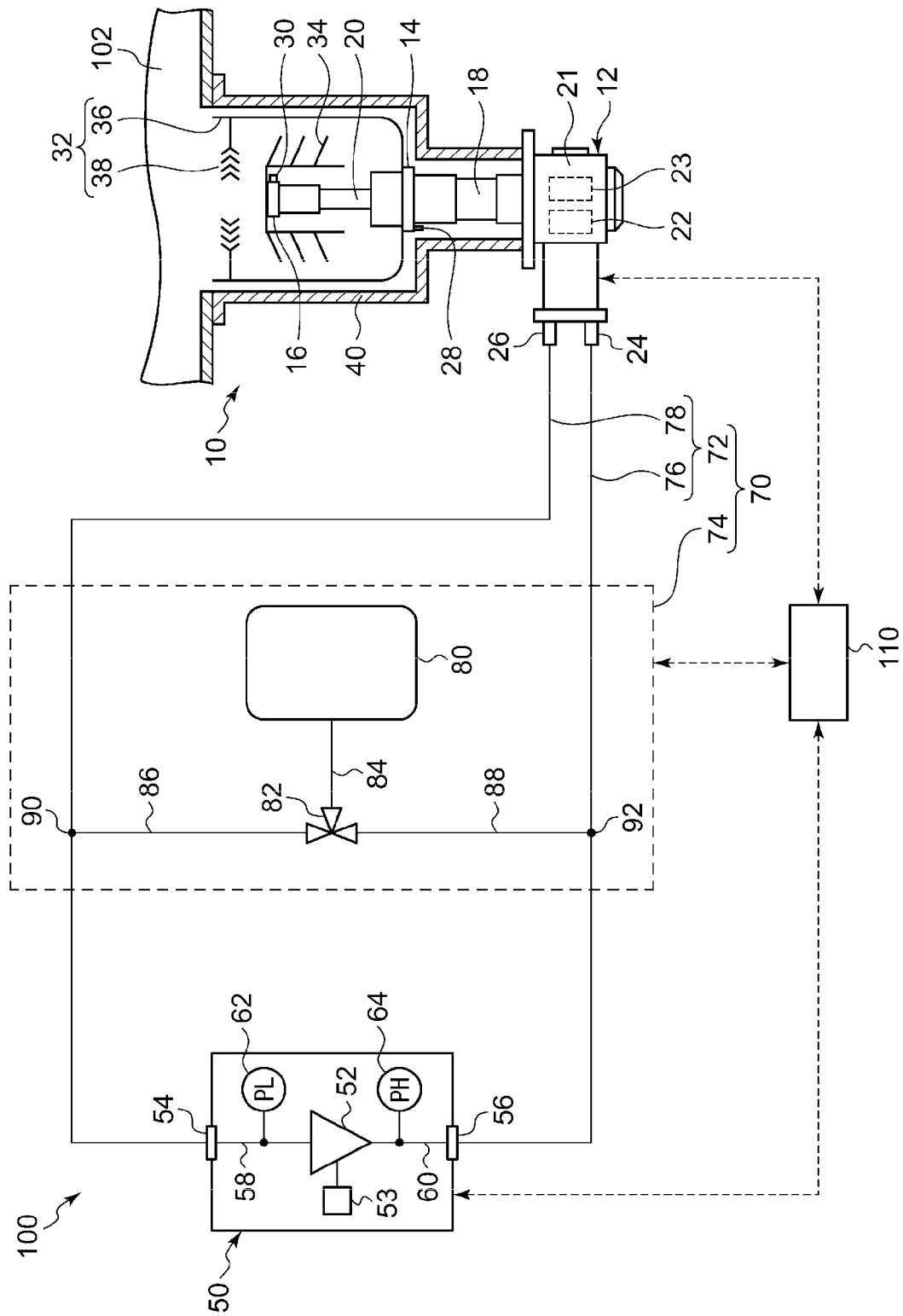
FIG. 1 is a schematic view of an overall configuration of a cryopump system according to an embodiment of the present invention.

The invention will now be described by reference to the preferred embodiments. This does not intend to limit the scope of the present invention, but to exemplify the invention.

A cryopump operates in a considerably wide range of temperatures. The cryopump is cooled to a cryogenic temperature for removing gases to generate a vacuum, and is also heated to a room temperature or a temperature somewhat higher than the room temperature for regeneration. According to the operating temperature of the cryopump, the temperature of a working gas changes. The cryopump and an associated compressor are typically connected by a closed circuit of the working gas, and the quantity of the working gas contained therein is constant. Hence, as the temperature of the working gas decreases, the operating pressure of the compressor also decreases. The operating pressure is related to electric power consumption. One of the most important demands on a cryopump system in recent years is to provide increased energy savings performance.

As the temperature of the working gas increases, the operating pressure of the compressor also increases. The compressor is generally provided with a preconfigured setting to give a warning of a deviation from a specified operating range. For example, the compressor has a high pressure set point defined electrically or mechanically in order to give a warning of an excessively high pressure of the working gas. Hence, as the temperature of the working gas increases, the operating pressure becomes more likely to reach the high pressure set point.

An exemplary object according to an aspect of the present invention is to provide a cryopump system to be operated with an appropriate working gas pressure, a method of operating the same, and a compressor unit, the method and the compressor unit being suitable for such a system.

A cryopump system according to an embodiment of the present invention includes: a cryopump configured to perform a preparatory operation including a cooldown from a room temperature to a cryogenic temperature and to perform a vacuum pumping operation at the cryogenic temperature; a compressor of a working gas for the cryopump; a gas line connecting the cryopump and the compressor; a gas volume adjuster configured to increase a quantity of the working gas in the gas line during the vacuum pumping operation in comparison with that during the preparatory operation; and a control device configured to control the compressor so as to provide a pressure control for the gas line.

According to this embodiment, the working gas is cooled during the preparatory operation, and a pressure of the working gas circulating in a gas line, or in other words, an operating pressure of the compressor is reduced. By increasing the quantity of the working gas, an appropriate operating pressure can be restored for the vacuum pumping operation.

A low operating pressure would result in a reduced electric power consumption when a compressor operates at a constant speed. Nonetheless, this is not the only factor that determines electric power consumption. A compression ratio of the compressor, for example, is also related to electric power consumption, and a low compression ratio reduces the power consumption. When the compressor is controlled with a certain pressure target, the compression ratio decreases as the operating pressure increases. Under such a pressure control, an increased operating pressure has an effect of reducing the electric power consumption unlike when the compressor is operated constantly. An increase in the quantity of the working gas thus allows the operating pressure to be restored, thereby reducing the electric power consumption of the compressor.

The preparatory operation may include a regeneration of the cryopump. The gas volume adjuster may be configured to reduce the quantity of the working gas in the gas line during the preparatory operation in comparison with that during the vacuum pumping operation.

According to this embodiment, the regeneration of the cryopump increases the temperature of the working gas and also the operating pressure of the compressor. A reduction in the quantity of the working gas can restrain an excessive increase in the operating pressure and restore an appropriate level thereof.

The gas volume adjuster may be configured to collect the working gas discharged from the gas line and replenish the gas line with the working gas.

According to this embodiment, the collected working gas is used for the replenishment; thus, the gas volume adjuster can add and remove the working gas to and from the gas line iteratively.

The control device may control a rotational speed of the compressor such that a differential pressure between a high pressure and a low pressure of the compressor meets a target value of the differential pressure.

Such a differential pressure control is an effective approach to provide the system with a constant refrigeration power. Under the differential pressure control, the compression ratio decreases as the operating pressure increases. Hence, the electric power consumption can be reduced while the refrigeration power of the system is maintained.

The gas volume adjuster may adjust the quantity of the working gas such that a high pressure of the compressor is maintained equal to or lower than an upper limit setting of the high pressure.

According to this embodiment, the operating pressure of the compressor can be maintained at an appropriate level such that the high pressure of the compressor does not exceed the upper limit setting. This contributes to the continuity of operation of the system because an excessively high pressure can be avoided.

FIG. 1 is a schematic view of an overall configuration of a cryopump system 100 according to an embodiment of the present invention. The cryopump system 100 is used to remove gases to generate a vacuum in a vacuum chamber 102. The vacuum chamber 102 is employed to provide a vacuum environment for a vacuum processing apparatus (for example, an apparatus used for manufacturing semiconductors, such as ion implanters and sputtering instruments).

The cryopump system 100 includes one or more cryopumps 10. The cryopump 10 is attached to the vacuum chamber 102 and used to increase the degree of vacuum in the chamber to a desired level.

The cryopump 10 includes a refrigerator 12. The refrigerator 12 is a cryogenic refrigerator, such as a Gifford-McMahon type refrigerator (generally called a GM refrigerator). The refrigerator 12 is a two-stage refrigerator including a first stage 14 and a second stage 16.

The refrigerator 12 includes a first cylinder 18 and a second cylinder 20. The first cylinder 18 includes a first expansion chamber defined therein, and the second cylinder 20 includes a second expansion chamber defined therein. The second expansion chamber is in communication with the first expansion chamber. The first cylinder 18 and the second cylinder 20 are mutually connected in series. The first cylinder 18 connects a motor housing 21 and the first stage 14. The second cylinder 20 connects the first stage 14 and the second stage 16. The first cylinder 18 and the second cylinder 20 include a first displacer and a second displacer therein, respectively (not shown). The first displacer and the second displacer are mutually connected. The first displacer and the second displacer each include a built-in regenerator therein.

The motor housing 21 of the refrigerator 12 accommodates a refrigerator motor 22 and a gas channel switching mechanism 23. The refrigerator motor 22 provides a driving force for the first and second displacers, and the gas channel switching mechanism 23. The refrigerator motor 22 is connected to the first displacer and the second displacer such that the first displacer and the second displacer can reciprocate in the first cylinder 18 and the second cylinder 20, respectively.

The gas channel switching mechanism 23 is configured to cyclically switch a channel of the working gas in order to periodically repeat the expansion of the working gas in the first expansion chamber and the second expansion chamber. The refrigerator motor 22 is connected to a movable valve (not shown) of the gas channel switching mechanism 23 such that the valve can be operated in forward and reverse directions. The movable valve is, for example, a rotary valve.

The motor housing 21 includes a high pressure gas inlet 24 and a low pressure gas outlet 26. The high pressure gas inlet 24 is formed at an end of a high pressure channel of the gas channel switching mechanism 23, and the low pressure gas outlet 26 is formed at an end of a low pressure channel of the gas channel switching mechanism 23.

The refrigerator 12 derives, from the expansion therein of a high pressure working gas (helium, for example), cooling at the first stage 14 and the second stage 16. The high pressure working gas is supplied from a compressor unit 50 through the high pressure gas inlet 24 to the refrigerator 12. The refrigerator motor 22 at this point of time switches the gas channel switching mechanism 23 such that the high pressure gas inlet 24 is connected to the expansion chambers. When the expansion chambers of the refrigerator 12 are filled with the high pressure working gas, the refrigerator motor 22 switches the gas channel switching mechanism 23 such that the expansion chambers are connected to the low pressure gas outlet 26. The working gas is adiabatically expanded and discharged through the low pressure gas outlet 26 to the compressor unit 50. The first and second displacers reciprocate in the expansion chambers in synchronization with the operation of the gas channel switching mechanism 23. By repeating such a thermal cycle, the first stage 14 and the second stage 16 are cooled.

The second stage 16 is cooled to a temperature lower than that of the first stage 14. The second stage 16 is cooled to, for example, about 10 K to 20 K, and the first stage 14 is cooled to, for example, about 80 K to 100 K. The first stage 14 is provided with a first temperature sensor 28 for measuring the temperature of the first stage 14, and the second stage 16 is provided with a second temperature sensor 30 for measuring the temperature of the second stage 16.

The refrigerator 12 is configured to provide a so-called reverse temperature elevation by a reverse operation of the refrigerator motor 22. The refrigerator 12 is configured to cause the working gas to adiabatically compress by operating the movable valve of the gas channel switching mechanism 23 in the reverse direction to the cooling operation described above. The refrigerator 12 can heat the first stage 14 and the second stage 16 with heat of compression thus obtained.

The cryopump 10 includes a first cryopanel 32 and a second cryopanel 34. The first cryopanel 32 is fixed such that it is thermally connected to the first stage 14, and the second cryopanel 34 is fixed such that it is thermally connected to the second stage 16. The first cryopanel 32 includes a heat shield 36 and a baffle 38 and encloses the second cryopanel 34. The second cryopanel 34 includes an adsorbent on a surface thereof. The first cryopanel 32 is accommodated in a cryopump housing 40. One end of the cryopump housing 40 is attached to the motor housing 21. A flange at another end of the cryopump housing 40 is attached to a gate valve (not shown) of the vacuum chamber 102. The cryopump 10 may be any publicly known cryopump.

The cryopump system 100 includes the compressor unit 50 and a working gas circuit 70 that connects the cryopump 10 and the compressor unit 50. The compressor unit 50 is provided to circulate the working gas in the working gas circuit 70. The working gas circuit 70 is a closed fluid circuit that includes the cryopump 10.

The compressor unit 50 includes a compressor 52 and a compressor motor 53. The compressor 52 is configured to compress the working gas and the compressor motor 53 is configured to operate the compressor 52. The compressor unit 50 includes a low pressure gas inlet 54 and a high pressure gas outlet 56. The low pressure gas inlet 54 is arranged to receive a low pressure working gas and the high pressure gas outlet 56 is arranged to discharge the high pressure working gas. The low pressure gas inlet 54 is connected through a low pressure channel 58 to an intake port of the compressor 52, and the high pressure gas outlet 56 is connected through a high pressure channel 60 to a delivery port of the compressor 52.

The compressor unit 50 includes a first pressure sensor 62 and a second pressure sensor 64. The first pressure sensor 62 is disposed in the low pressure channel 58 for measuring the pressure of the low pressure working gas, and the second pressure sensor 64 is disposed in the high pressure channel 60 for measuring the pressure of the high pressure working gas. Here, the first pressure sensor 62 and the second pressure sensor 64 may be disposed at appropriate locations in the working gas circuit 70 outside the compressor unit 50.

The working gas circuit 70 includes a gas line 72 and a gas volume adjuster 74 that is configured to adjust the quantity of the working gas in the gas line 72. The amount of substance (mol) or the mass of the working gas contained in the gas line 72 may be referred to as a "gas volume" herein for convenience of description. Under a certain reference temperature and a reference pressure, the amount of substance or the mass of a working gas occupying a given capacity or volume is uniquely determined. The capacity of the gas line 72 is substantially constant. With a certain gas volume contained in the gas line 72, the pressure of the working gas decreases as the temperature of the gas decreases. Likewise, the pressure of the working gas increases as the temperature of the gas increases.

The gas line 72 includes a high pressure line 76 and a low pressure line 78. The high pressure line 76 is provided for supplying the working gas from the compressor unit 50 to the cryopump 10, and the low pressure line 78 is provided for returning the working gas from the cryopump 10 to the compressor unit 50. The high pressure line 76 constitutes the piping connecting the high pressure gas inlet 24 of the cryopump 10 and the high pressure gas outlet 56 of the compressor unit 50. The low pressure line 78 constitutes the piping connecting the low pressure gas outlet 26 of the cryopump 10 and the low pressure gas inlet 54 of the compressor unit 50.

The compressor unit 50 collects the low pressure working gas discharged by the cryopump 10 through the low pressure line 78. The compressor 52 compresses the low pressure working gas to generate the high pressure working gas. The compressor unit 50 supplies the high pressure working gas through the high pressure line 76 to the cryopump 10.

The gas volume adjuster 74 includes a buffer volume, which is, for example, at least one buffer tank 80. The gas volume adjuster 74 includes a channel selector 82 for selecting a connecting channel that connects the buffer tank 80 and the gas line 72. The channel selector 82 includes at least one control valve. The gas volume adjuster 74 includes a buffer channel 84 for connecting the buffer tank 80 to the channel selector 82. Here, a buffer pressure sensor may be provided to measure a pressure of the gas in the buffer tank 80.

The gas volume adjuster 74 includes a gas replenishing channel 86 and a gas collecting channel 88. The gas replenishing channel 86 allows the working gas in the buffer tank 80 to flow into the low pressure line 78. The gas collecting channel 88 allows the working gas in the high pressure line 76 to flow into the buffer tank 80. The gas replenishing channel 86 connects the channel selector 82 to a first branch 90 of the low pressure line 78. The gas collecting channel 88 connects the channel selector 82 to a second branch 92 of the high pressure line 76.

The channel selector 82 is configured to be able to select between a replenishing state and a collecting state. In the replenishing state, the gas replenishing channel 86 is used for fluid communication with the low pressure line 78, whereas the gas collecting channel 88 is blocked. Conversely, in the collecting state, the gas replenishing channel 86 is blocked, whereas the gas collecting channel 88 is used for fluid communication with the high pressure line 76.

The channel selector 82 includes, for example, a three-way valve as illustrated. Three ports of the three-way valve are connected to the buffer channel 84, the gas replenishing channel 86, and the gas collecting channel 88, respectively. The channel selector 82 can thus connect the buffer channel 84 to the gas replenishing channel 86 to achieve the replenishing state, and connect the buffer channel 84 to the gas collecting channel 88 to achieve the collecting state.

The gas volume adjuster 74 is provided as an accessory to the compressor unit 50, and is regarded as a component of the compressor unit 50. The gas volume adjuster 74 may be incorporated in the compressor unit 50. Alternatively, the gas volume adjuster 74 may be provided separately from the compressor unit 50 and disposed at any location of the gas line 72.

The cryopump system 100 includes a control device 110 for controlling the operation thereof. The control device 110 is provided as an integral part of, or separately from, the cryopump 10 (or the compressor unit 50). The control device 110 includes, for example, a CPU for performing various arithmetic operations, a ROM for storing different control programs, a RAM for providing a work area to store data and execute programs, an input/output interface, and a memory. A publicly known controller thus configured may be used as the control device 110. The control device 110 may be a single controller or include a plurality of controllers each performing an identical or different function.

Figure 2:
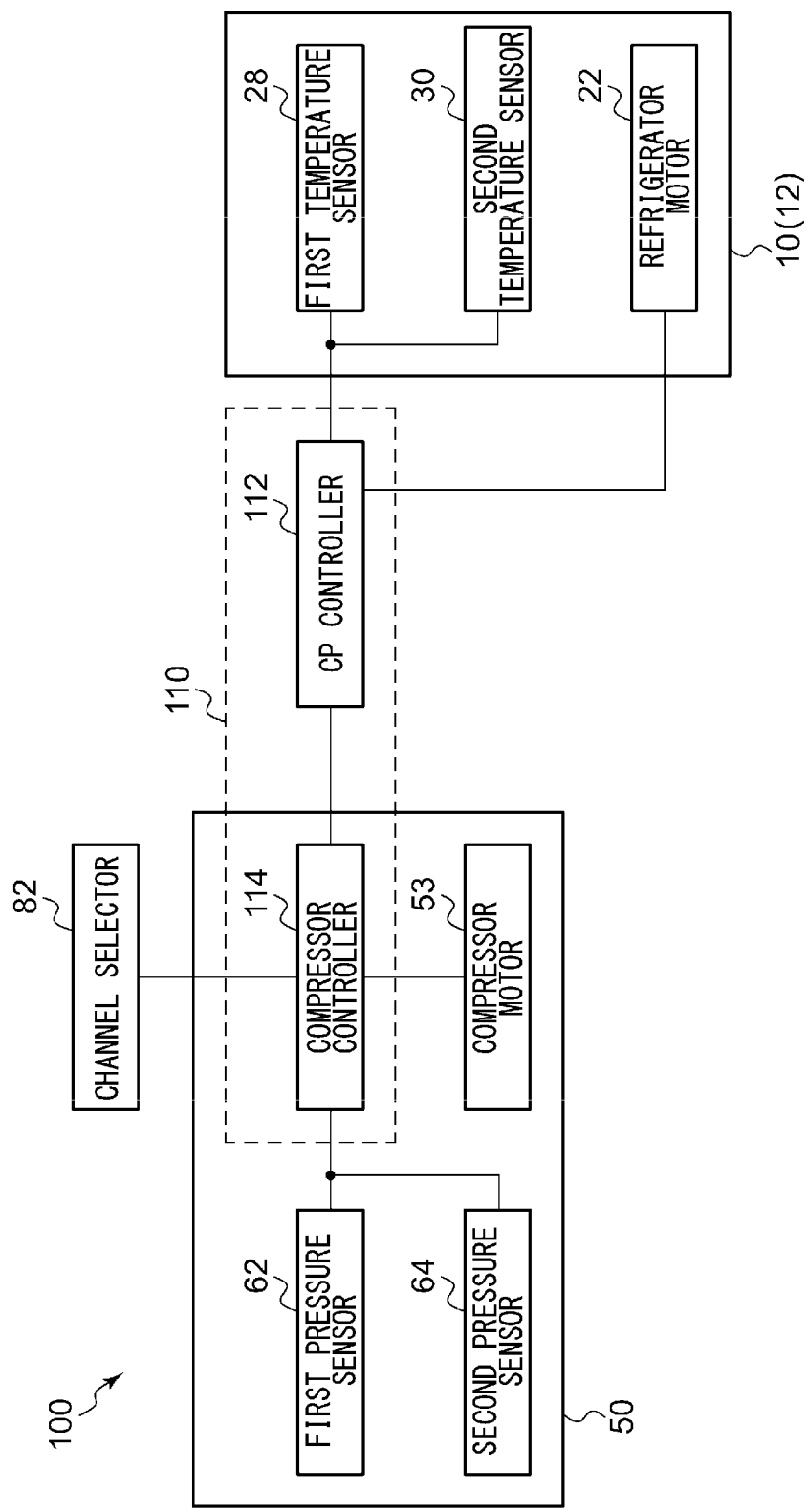
FIG. 2 is a block diagram of a schematic configuration of a control device for the cryopump system according to an embodiment of the present invention.

FIG. 2 is a block diagram of a schematic configuration of the control device 110 for the cryopump system 100 according to an embodiment of the present invention. FIG. 2 is a diagram of a main part of the cryopump system 100 according to the embodiment of the present invention.

The control device 110 is provided for controlling the cryopump 10 (i.e. the refrigerator 12), the compressor unit 50, and the gas volume adjuster 74. The control device 110 includes a cryopump controller (hereinafter also referred to as CP controller) 112 for controlling the operation of the cryopump 10 and a compressor controller 114 for controlling the operation of the compressor unit 50.

The CP controller 112 is configured to receive signals representing temperatures measured by the first temperature sensor 28 and the second temperature sensor 30 of the cryopump 10. The CP controller 112 controls the cryopump 10, for example, based on a measured temperature that has been received. In this case, the CP controller 112, for example, controls a rotational speed (for example, an operating frequency) of the refrigerator motor 22 such that a temperature measured by the first (or second) temperature sensor 28 (30) agrees with a target temperature of the first (or second) cryopanel 32 (34). This type of control allows the rotational speed of the refrigerator motor 22 to be adjusted appropriately depending on a thermal load, thereby contributing to a reduction in the electric power consumption of the cryopump 10.

The compressor controller 114 is configured to provide a pressure control for the gas line 72. The compressor controller 114 is configured to receive signals representing pressures measured by the first pressure sensor 62 and the second pressure sensor 64 in order to provide the pressure control. The compressor controller 114 controls a rotational speed (an operating frequency, for example) of the compressor motor 53 such that a pressure measurement value agrees with a target pressure value.

The compressor controller 114 is also configured to control the channel selector 82 of the gas volume adjuster 74. The compressor controller 114 selects either the replenishing state or the collecting state based on necessary information, and controls the channel selector 82 depending on a result of the selection. The control of the compressor unit 50 and the gas volume adjuster 74 will be described in detail with reference to FIGS. 4 and 5.

Figure 3:
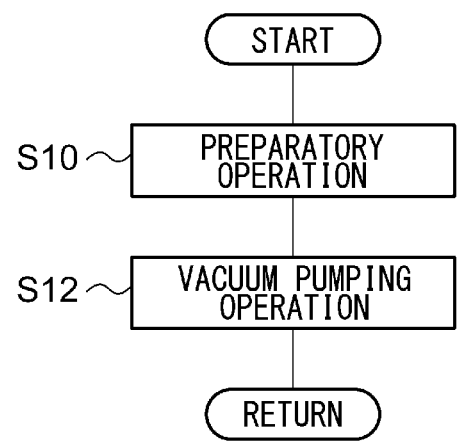
FIG. 3 is a flow chart for describing a method of operating a cryopump in association with an embodiment of the present invention.

FIG. 3 is a flow chart for describing a method of operating the cryopump 10 in association with an embodiment of the present invention. This method of operation includes a preparatory operation (S10) and a vacuum pumping operation (S12). The vacuum pumping operation is the normal operation of the cryopump 10. The preparatory operation includes any state of operation to be performed before the normal operation. The CP controller 112 executes this method of operation timely and iteratively.

The preparatory operation (S10) is, for example, a startup of the cryopump 10. The startup of the cryopump 10 includes a cooldown for cooling the cryopanels 32 and 34 from an environmental temperature (for example, a room temperature), in which the cryopump 10 is located, to a cryogenic temperature. A target cooling temperature of the cooldown is a normal operating temperature set for the vacuum pumping operation. The normal operating temperature is selected from a range of about 80 K to 100 K for the first cryopanel 32, and from a range of about 10 K to 20 K for the second cryopanel 34 as described above.

The preparatory operation (S10) may be the regeneration of the cryopump 10. The regeneration is performed after the current vacuum pumping operation is completed, which is a preparation for the next vacuum pumping operation. The regeneration is a so-called full regeneration that regenerates the first and second cryopanels 32 and 34, or a partial regeneration to regenerate the second cryopanel 34.

The regeneration includes a warming process, a discharging process, and a cooling process. The warming process includes warming of the cryopump 10 to a regeneration temperature that is higher than the normal operating temperature. In the case of the full regeneration, the regeneration temperature is, for example, the room temperature or a temperature somewhat higher than the room temperature (for example, about 290 K to about 300 K). A heat source for the warming process is, for example, a reverse temperature elevation of the refrigerator 12 and/or a heater (not shown) attached to the refrigerator 12.

The discharging process includes discharging to the outside of the cryopump 10 gases that have been revaporized from the surfaces of the cryopanels. The revaporized gases, together with a purge gas to be introduced as appropriate, are discharged to the outside of the cryopump 10. In the discharging process, the operation of the refrigerator 12 is stopped. The cooling process includes cooling again the cryopanels 32 and 34 in order to restart the vacuum pumping operation. The cooling process is similar to the cooldown for the startup in terms of the state of operation of the refrigerator 12.

A time period of the preparatory operation constitutes downtime of the cryopump 10 (in other words, the vacuum pumping operation is suspended for the time period); therefore, it is desirable that this time period be as short as possible. In contrast, the normal vacuum pumping operation is a steady state of operation for maintaining the normal operating temperature. Hence, the preparatory operation imposes an increased load to the cryopump 10 (i.e. the refrigerator 12) in comparison with the normal operation. The operation of the cooldown, for example, demands from the refrigerator 12 a higher refrigeration power than the normal operation. Similarly, the operation of the reverse temperature elevation demands from the refrigerator 12 a high power for temperature elevation. Hence, the refrigerator motor 22 is operated at a considerably high rotational speed (for example, at a speed near the maximum rotational speed in an acceptable range) during the preparatory operation in most cases.

In parallel with the preparatory operation of the cryopump 10, a preparatory operation of the compressor unit 50 may be performed. The preparatory operation of the compressor unit 50 may include a preparatory action for a gas volume adjustment according to an embodiment of the present invention. This preparatory action may include a reset action for restoring the pressure of the buffer tank 80 to an initial pressure. This initial pressure is equivalent to a precharge pressure of the working gas into the working gas circuit 70.

For the reset action, the compressor controller 114 opens the buffer tank 80 to the gas line 72 when the operation of the compressor unit 50 is stopped and a high pressure and a low pressure of the gas line 72 are thus substantially equal to each other. The buffer tank 80 can be therefore restored to have an intermediate pressure that is between the high pressure and the low pressure of the compressor unit 50. The preparatory action is performed during a time period when the operation of the refrigerator 12 is stopped (for example, during the discharging process of the regeneration).

The vacuum pumping operation (S12) constitutes a state of operation where gas molecules coming from the vacuum chamber 102 toward the cryopump 10 are trapped through condensation or adsorption onto the surfaces of the cryopanels 32 and 34 that have been cooled to cryogenic temperatures. The first cryopanel 32 (for example, the baffle 38) causes gases (for example, water) having vapor pressures that are sufficiently reduced by a cooling temperature thereof to condense thereon. Gases having vapor pressures that are not sufficiently reduced by the cooling temperature of the baffle 38 pass through the baffle 38 and enter the heat shield 36. The second cryopanel 34 causes gases (for example, argon) having vapor pressures sufficiently reduced by a cooling temperature thereof to condense thereon. Gases (for example, hydrogen) having vapor pressures not sufficiently reduced by the cooling temperature of the second cryopanel 34 are adsorbed onto the adsorbent of the second cryopanel 34. The cryopump 10 thus can bring the degree of vacuum of the vacuum chamber 102 to a desired level.

Figure 4:
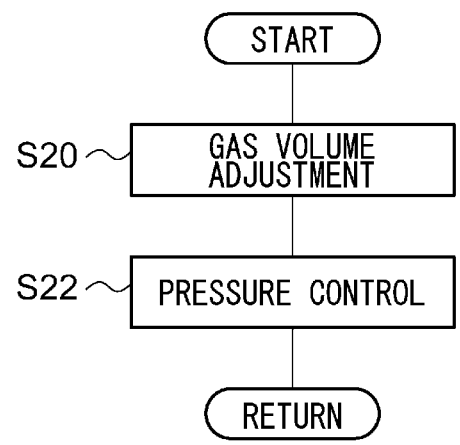
FIG. 4 is a flow chart for describing a method of operating the cryopump system according to an embodiment of the present invention.

FIG. 4 is a flow chart for describing a method of operating the cryopump system 100 according to an embodiment of the present invention. This method of operation includes the gas volume adjustment (S20) and the pressure control (S22). The compressor controller 114 executes this method of operation timely and iteratively.

The gas volume adjustment (S20) is a process to adjust the gas volume, or in other words, the quantity of the working gas circulating between the cryopump 10 and the compressor unit 50. An example will be described with reference to FIG. 5.

The pressure control (S22) is a process to control the rotational speed (the operating frequency, for example) of the compressor motor 53, with the adjusted gas volume, such that a pressure measurement value agrees with a target pressure value. This pressure control is executed continuously in parallel with the preparatory operation of the cryopump 10 or the vacuum pumping operation.

The target pressure value is, for example, a target value of a differential pressure between the high pressure and the low pressure of the compressor 52. In this case, the compressor controller 114 performs a constant differential pressure control in which the rotational speed of the compressor motor 53 is controlled such that a differential pressure between the pressure measured by the first pressure sensor 62 and the pressure measured by the second pressure sensor 64 agrees with a target differential pressure value. Here, the target pressure value may be changed while the pressure control is performed.

According to the pressure control, the rotational speed of the compressor motor 53 can be adjusted appropriately depending on a gas quantity required by the refrigerator 12, contributing to a reduction in the electric power consumption of the cryopump system 100. In addition, the differential pressure may be a major factor for determining the refrigeration power of the refrigerator 12, and thus, according to the constant differential pressure control, the refrigeration power of the refrigerator 12 can be maintained at a target refrigeration power. Hence, the constant differential pressure control is particularly preferred for the cryopump system 100 in that the refrigeration power of the refrigerator 12 can be maintained while the electric power consumption by the system can be reduced.

Alternatively, the target pressure value may be a target high pressure value (or a target low pressure value). In this case, the compressor controller 114 performs a constant high pressure control (or a constant low pressure control) in which the rotational speed of the compressor motor 53 is controlled such that the pressure measured by the second pressure sensor 64 (or the first pressure sensor 62) agrees with the target high pressure value (or the target low pressure value).

Figure 5:
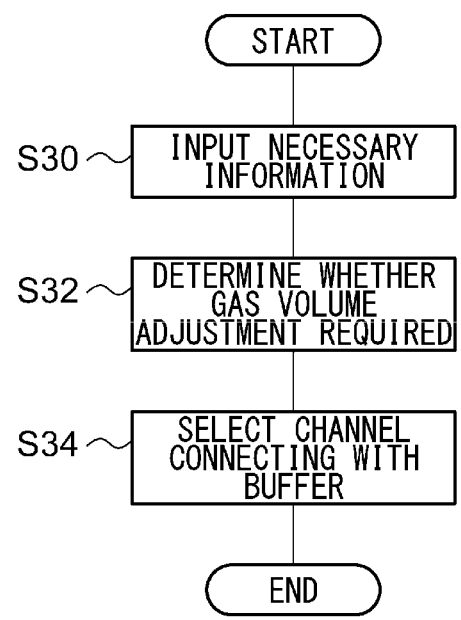
FIG. 5 is a flow chart for describing a gas volume adjustment process according to an embodiment of the present invention.

FIG. 5 is a flow chart for describing the gas volume adjustment process according to an embodiment of the present invention. As described above, the compressor controller 114 controls the channel selector 82 for the gas volume adjustment (S20 of FIG. 4). For this purpose, the compressor controller 114 first receives necessary information for the gas volume adjustment (S30).

The necessary information may include the pressures measured by the first pressure sensor 62 and the second pressure sensor 64. The compressor controller 114 may obtain this necessary information from the CP controller 112. In other words, the necessary information may include the temperatures measured by the first temperature sensor 28 and the second temperature sensor 30 and the state of operation of the cryopump 10.

The compressor controller 114 determines whether the gas volume adjustment is required based on the input necessary information (S32). The compressor controller 114 determines whether the gas volume adjustment is required based on, for example, the state of operation of the cryopump 10. In this case, the compressor controller 114 may determine that it is necessary to increase the gas volume at a time when the cooldown operation is completed or at a time when the vacuum pumping operation is started. In this way, the operating pressure of the compressor unit 50 can be restored effectively from the minimized pressure after the cooldown operation.

The compressor controller 114 may also determine that it is necessary to reduce the gas volume at a time when the vacuum pumping operation is completed or at a time when the regeneration is started. According to empirical knowledge, the operating pressure increases relatively significantly at a beginning of the regeneration. Hence, the operating pressure can be restored to an appropriate level effectively in this way. Here, the compressor controller 114 may determine that it is necessary to reduce the gas volume at any point of time before the cooldown operation, when the operation of the refrigerator 12 is stopped after the vacuum pumping operation is completed (that is, when the reverse temperature elevation is not performed).

In an embodiment, the compressor controller 114 may determine whether the gas volume adjustment is required based on an operating temperature of the cryopump 10. The compressor controller 114 may use the temperature measured by the second temperature sensor 30 as the operating temperature of the cryopump 10. In this case, the compressor controller 114 may determine that it is necessary to increase the gas volume when the measured temperature drops below a first threshold temperature. The compressor controller 114 may also determine that it is necessary to reduce the gas volume when the measured temperature exceeds a second threshold temperature.

The first threshold temperature and the second threshold temperature are set in association with the normal operating temperature of the vacuum pumping operation. The first threshold temperature may be set to, for example, the target cooling temperature of the cooldown operation. In this way, the gas volume can be increased in conformance with the completion of the cooldown operation. The second threshold temperature is selected from a temperature range from a temperature above the normal operating temperature to a temperature of, for example, 20 K (or 30 K) or less. In this way, the gas volume can be reduced in conformance with the start of the regeneration.

Here, the compressor controller 114 may determine whether the gas volume adjustment is required based on the measured pressure of the working gas circuit 70 in lieu of the operating temperature of the cryopump 10. As described above, the temperature and the pressure of the working gas circuit 70 are in conjunction with each other, and therefore, the need for the gas volume adjustment can be determined appropriately based also on the measured pressure in a similar manner.

Subsequent to the determination of the need for the gas volume adjustment, the compressor controller 114 selects a channel connecting with the buffer (S34). If it has been determined that the gas volume adjustment is necessary, the compressor controller 114 switches the connecting channel of the buffer tank 80 to the gas line 72. Conversely, if it has been determined that the gas volume adjustment is not necessary, the compressor controller 114 keeps the connecting channel of the buffer tank 80 to the gas line 72 unswitched.

If it is determined that it is necessary to increase the gas volume, the compressor controller 114 blocks the gas collecting channel 88 and opens the gas replenishing channel 86 to connect the buffer tank 80 to the low pressure line 78 (see FIG. 1). The buffer tank 80 acts as a high pressure gas source to the low pressure line 78. The working gas stored in the buffer tank 80 is added through the gas replenishing channel 86 to the low pressure line 78. The quantity of the working gas in the gas line 72 is increased from an initial gas quantity to a normal gas quantity. The initial gas quantity is a gas volume for the preparatory operation of the cryopump 10, and the normal gas quantity is a gas volume for the normal operation (i.e. the vacuum pumping operation). The working gas is released from the buffer tank 80 to the low pressure line 78, resulting in a reduced pressure in the buffer tank 80.

If it is determined that it is necessary to reduce the gas volume, the compressor controller 114 blocks the gas replenishing channel 86 and opens the gas collecting channel 88 to connect the buffer tank 80 to the high pressure line 76. The buffer tank 80 acts as a low pressure gas source to the high pressure line 76. The working gas is discharged from the high pressure line 76 to the gas collecting channel 88 and collected in the buffer tank 80. In this way, the quantity of the working gas in the gas line 72 is reduced from the normal gas quantity to the initial gas quantity. The working gas is charged into the buffer tank 80 from the high pressure line 76, resulting in an increased pressure in the buffer tank 80.

The gas volume adjustment (S20 of FIG. 4) is thus completed, and the pressure control (S22 of FIG. 4) is performed with the adjusted gas volume. Note that the gas replenishing channel 86 or the gas collecting channel 88 opened for the gas volume adjustment may be left open until the next adjustment, or may be closed before the next adjustment at an appropriate point of time.

Here, the CP controller 112, in lieu of the compressor controller 114, may control the channel selector 82 of the gas volume adjuster 74. In this case, the CP controller 112 may obtain a measured pressure from the compressor controller 114 and use the measured pressure and/or other necessary information to control the channel selector 82.

Figure 6:
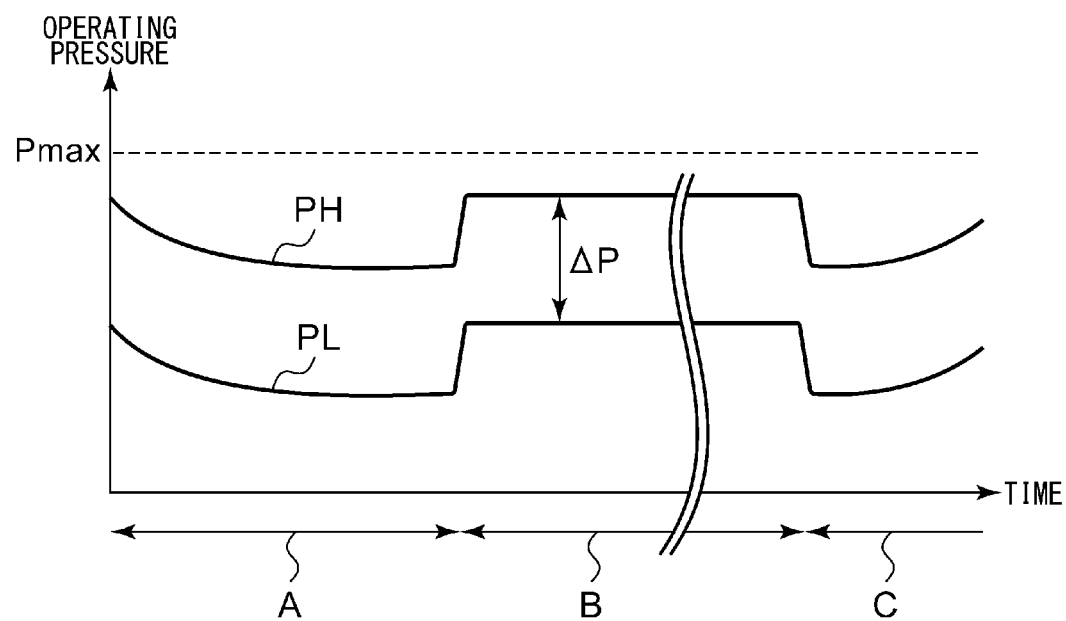
FIG. 6 is a graph schematically showing changes in operating pressures of a compressor unit according to an embodiment of the present invention.

FIG. 6 is a graph schematically showing changes in the operating pressures of the compressor unit 50 according to an embodiment of the present invention. In FIG. 6, the vertical axis represents the pressure and the horizontal axis represents the time. The graph illustrates changes in the high pressure PH of the compressor unit 50 (in other words, a delivery pressure of the compressor 52) and in the low pressure PL of the compressor unit 50 (in other words, an intake pressure of the compressor 52) through time periods of the cryopump 10, which are a time period A of the cooldown operation, a time period B of the vacuum pumping operation, and a time period C of the regeneration operation. In an example described by the graph, the compressor unit 50 is operated with the constant differential pressure control. Hence, the differential pressure $\Delta P$ between the high pressure PH and the low pressure PL is kept constant.

At an early stage during the time period A of the cooldown operation, the operating temperature of the cryopump 10 is high (at a room temperature, for example) and, thus, the operating pressures of the compressor unit 50 are also high. As the cooldown operation proceeds with the cooling, the working gas in the refrigerator 12 experiences a temperature decrease and shrinks. This causes the gas quantity staying and remaining in the expansion chambers of the refrigerator 12 to increase. In other words, the working gas is taken from the gas line 72 and trapped in the expansion chambers of the refrigerator 12. The quantity of the working gas in the gas line 72 is thus reduced, and as illustrated in the graph, the high pressure PH and the low pressure PL of the compressor unit 50 also each decrease.

The time period A of the cooldown operation ends when the target cooling temperature for the cooldown is achieved. The lowest temperature of this operation is reached when the time period A of the cooldown operation ends. In the subsequent time period B of the vacuum pumping operation, the cryopump 10 is operated stably so as to maintain the resultant cooling temperature. Hence, when the time period A of the cooldown operation ends, the operating pressures of the compressor unit 50 are the lowest.

Upon a transition from the cooldown to the vacuum pumping operation, the gas volume is adjusted to be increased. The gas volume adjuster 74 takes the replenishing state to increase the quantity of the working gas in the gas line 72 from the initial gas quantity to the normal gas quantity. In other words, the buffer pressure is released from the buffer tank 80 through the channel selector 82 to the low pressure line 78. As illustrated in the graph, the high pressure PH and the low pressure PL of the compressor unit 50 are thus increased discontinuously at the boundary between the time period A of the cooldown operation and the time period B of the vacuum pumping operation.

During the time period B of the vacuum pumping operation, the compressor unit 50 performs the constant differential pressure control in a steady state manner with the normal gas quantity. The operating pressures of the compressor unit 50 are maintained at pressure levels raised by the adjustment to increase the gas volume. The compression ratio at the compressor unit 50 will be smaller than that achieved when the constant differential pressure control would be performed at lower pressure levels with the initial gas quantity. A small compression ratio can be achieved by a reduced rotational speed of the compressor. Hence, the adjustment to increase the gas volume has an effect of reducing the electric power consumed during the vacuum pumping operation.

Upon a transition from the vacuum pumping operation to the regeneration, the gas volume is adjusted to be reduced. The gas volume adjuster 74 takes the collecting state to reduce the quantity of the working gas in the gas line 72 from the normal gas quantity to the initial gas quantity. In other words, the working gas is charged from the high pressure line 76 through the channel selector 82 to the buffer tank 80 to restore the buffer pressure. As illustrated in the graph, the high pressure PH and the low pressure PL of the compressor unit 50 are thus reduced discontinuously at the boundary between the time period B of the vacuum pumping operation and the time period C of the regeneration operation.

When the regeneration is started, the reverse temperature elevation of the cryopump 10 is performed. Unlike the case with the cooldown, the working gas is released from the refrigerator 12 to the gas line 72. The quantity of the working gas in the gas line 72 increases, and the high pressure PH and the low pressure PL of the compressor unit 50 also each increase as illustrated in the graph.

An amount of change in the operating pressures by the gas volume adjustment varies depending on the buffer volume and the buffer pressure. The buffer pressure is dependent on the precharge pressure of the working gas into the working gas circuit 70. Hence, the buffer volume and the working gas precharge pressure are designed to produce a desired change in the operating pressures. The buffer volume and the working gas precharge pressure are designed to, for example, restore at least part of an amount of pressure decrease due to a temperature decrease of the working gas. Alternatively, the buffer volume and the working gas precharge pressure may be designed to increase the pressures, by the adjustment to increase the gas volume, to exceed the amount of pressure decrease.

The compressor unit 50 is, in some cases, configured to forcibly switch from a steady state operation (for example, the constant differential pressure control) to a protective operation to reduce the pressure or to an operation shutdown when the high pressure PH of the compressor unit 50 reaches a specified limit pressure. This limit pressure is, for example, a high pressure set point defined electrically or mechanically in order to give a warning of an excessively high pressure of the working gas.

To avoid this, an amount of pressure increase is defined for the operating pressure such that the increased high pressure PH of the compressor unit 50 remains equal to or lower than an upper limit pressure Pmax that has been set, as illustrated in the graph. The upper limit pressure Pmax is set by, for example, subtracting a predetermined margin from the limit pressure of the compressor unit 50. In this way, the operating pressure can be maintained at an appropriate level. An inadvertent operation shutdown or a protective operation of the compressor unit 50 can be avoided.

Similarly, the buffer volume and the working gas precharge pressure are designed to absorb, by the adjustment to reduce the gas volume, at least part of an amount of pressure increase due to a temperature increase of the working gas. In this case, the amount of pressure increase is also defined such that the increased high pressure PH of the compressor unit 50 remains equal to or lower than the upper limit pressure Pmax that has been set.

As described above, the gas volume is reduced for the preparatory operation of the cryopump 10 and increased for the normal operation according to this embodiment. The operating pressure of the compressor unit 50 can be thus adjusted to an appropriate level depending on a state of operation of the cryopump 10. The cryopump system 100 including the compressor unit 50 with the electric power consumption reduced during the normal operation and the continuity of operation enhanced during the preparatory operation is provided.

The above has described the present invention based on an embodiment. Those skilled in the art will appreciate that the present invention is not limited to the embodiment described above, that various design changes and modifications are possible, and that such modifications are within the scope of the present invention.

Figure 7:
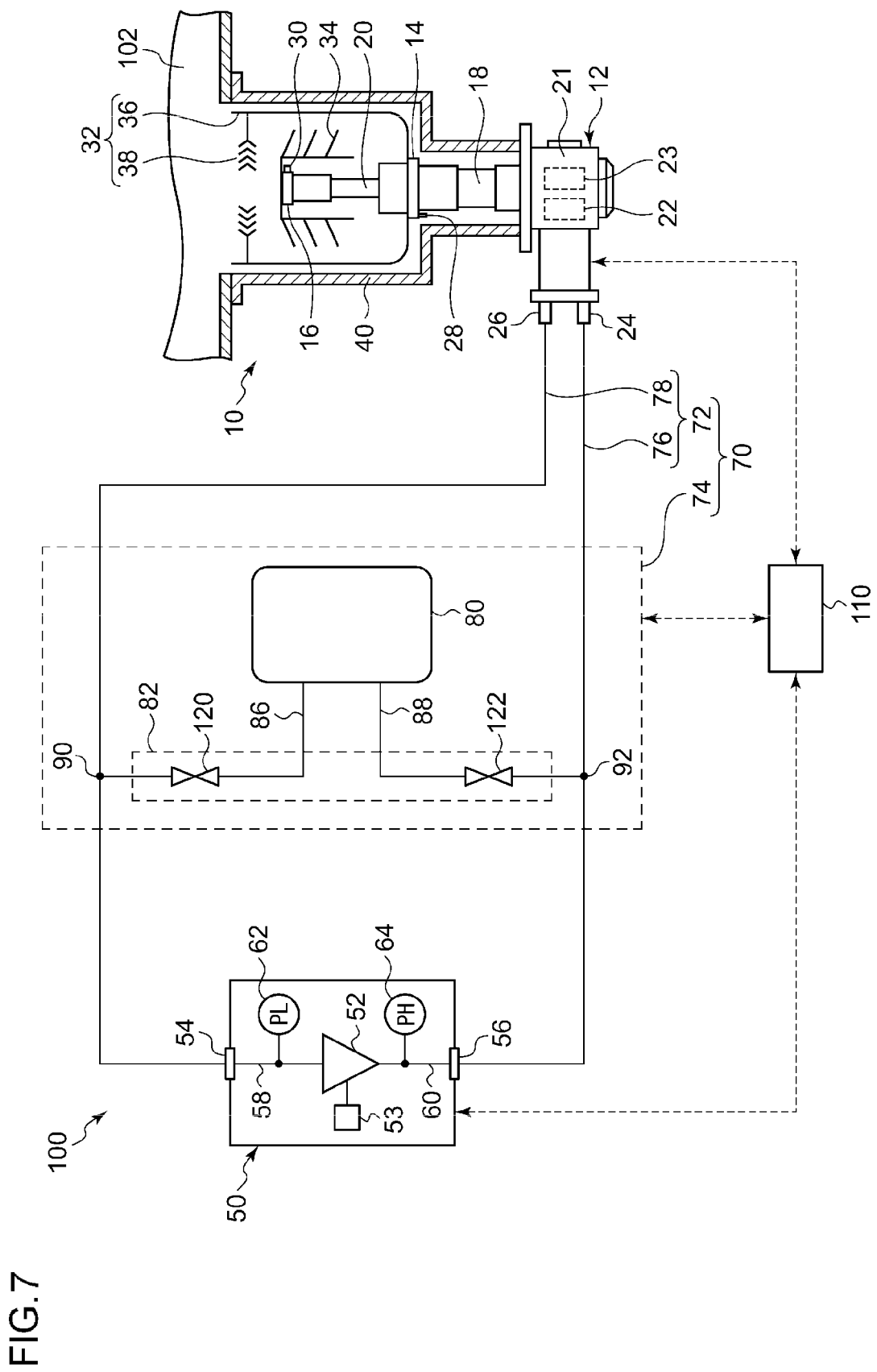
FIG. 7 is a schematic view of an overall configuration of a cryopump system according to another embodiment of the present invention.

The gas volume adjuster 74 is not limited to the specific configuration illustrated in FIG. 1. The channel selector 82 may include a plurality of control valves as illustrated in FIG. 7, for example. As illustrated, a channel selector 82 includes a first control valve 120 and a second control valve 122. The first control valve 120 and the second control valve 122 are two-way valves. The first control valve 120 is provided at a midpoint in a gas replenishing channel 86. The gas replenishing channel 86 connects a buffer tank 80 to a low pressure line 78. The second control valve 122 is provided at a midpoint in a gas collecting channel 88. The gas collecting channel 88 connects the buffer tank 80 to a high pressure line 76.

Figure 8:
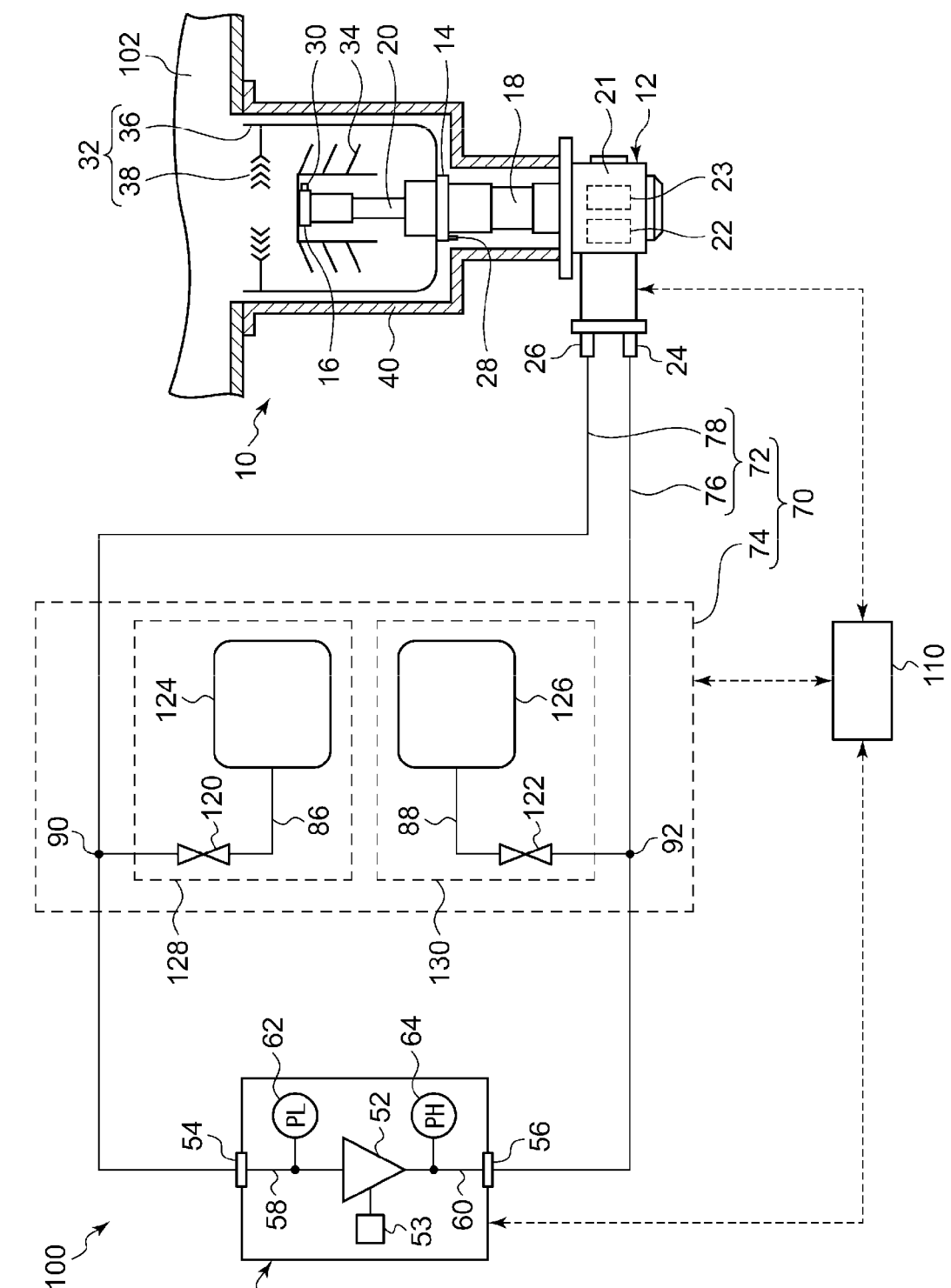
FIG. 8 is a schematic view of an overall configuration of a cryopump system according to still another embodiment of the present invention.

Furthermore, the gas volume adjuster 74 may include a plurality of buffer tanks as illustrated in FIG. 8. As illustrated, the gas volume adjuster 74 includes a first buffer tank 124 and a second buffer tank 126. The first buffer tank 124 is connected through a gas replenishing channel 86 to a low pressure line 78. The second buffer tank 126 is connected through a gas collecting channel 88 to a high pressure line 76. Similarly to the embodiment illustrated in FIG. 7, the gas replenishing channel 86 is provided with a first control valve 120 and the gas collecting channel 88 is provided with a second control valve 122.

In an embodiment illustrated in FIG. 8, the pressure of the first buffer tank 124 is reduced by the adjustment to increase the gas volume. The pressure of the second buffer tank 126 is increased by the adjustment to reduce the gas volume. It is therefore desirable that the reset action described above be performed timely. That is, the first buffer tank 124 and the second buffer tank 126 are each opened to a gas line 72 to restore the respective gas pressures to initial pressures while the operation of the compressor unit 50 is stopped.

In the embodiment illustrated in FIG. 8, it is possible to consider that the gas volume adjuster 74 includes a gas replenishing subpart 128 and a gas collecting subpart 130. The gas replenishing subpart 128 includes the first buffer tank 124 and the first control valve 120. The gas collecting subpart 130 includes the second buffer tank 126 and the second control valve 122. The gas replenishing subpart 128 may, in lieu of the first buffer tank 124, include a working gas source having a pressure higher than that of the low pressure line 78. The gas collecting subpart 130 may, in lieu of the second buffer tank 126, include a reservoir to receive the working gas from the high pressure line 76.

In an embodiment, a gas volume adjuster 74 may include only one of a gas replenishing subpart 128 and a gas collecting subpart 130. By including the gas replenishing subpart 128, the adjustment to increase the gas volume can be provided for the vacuum pumping operation. Such a configuration can be useful for a case where the reverse temperature elevation is not performed during the regeneration. By including the gas collecting subpart 130, the adjustment to reduce the gas volume can be provided for the preparatory operation.

Furthermore, a point of time to switch a connection of the buffer tank 80 to the gas line 72 may not be in synchronization with that to switch the state of operation of the cryopump. For example, in a case of a transition from the cooldown to the vacuum pumping operation, the adjustment to increase the gas volume may be performed during the cooldown. In this case, the working gas may be replenished from the gas volume adjuster 74 to the gas line 72 in stages (or continuously) in conjunction with the temperature decrease of the cryopump 10. For this purpose, the gas volume adjuster 74 may include in the gas replenishing channel 86 a flow control valve to be controlled depending on a measured temperature (or a measured pressure). Furthermore, the adjustment to increase the gas volume may be performed after the vacuum pumping operation is started.

Similarly, in a case of a transition from the vacuum pumping operation to the regeneration, the adjustment to reduce the gas volume may be performed during the regeneration. In this case, the working gas may be collected from the gas line 72 to the gas volume adjuster 74 in stages (or continuously) in conjunction with the temperature increase of the cryopump 10. For this purpose, the gas volume adjuster 74 may include in the gas collecting channel 88 a flow control valve to be controlled depending on a measured temperature (or a measured pressure). Furthermore, the adjustment to reduce the gas volume may be performed before the vacuum pumping operation is completed.

Figure 9:
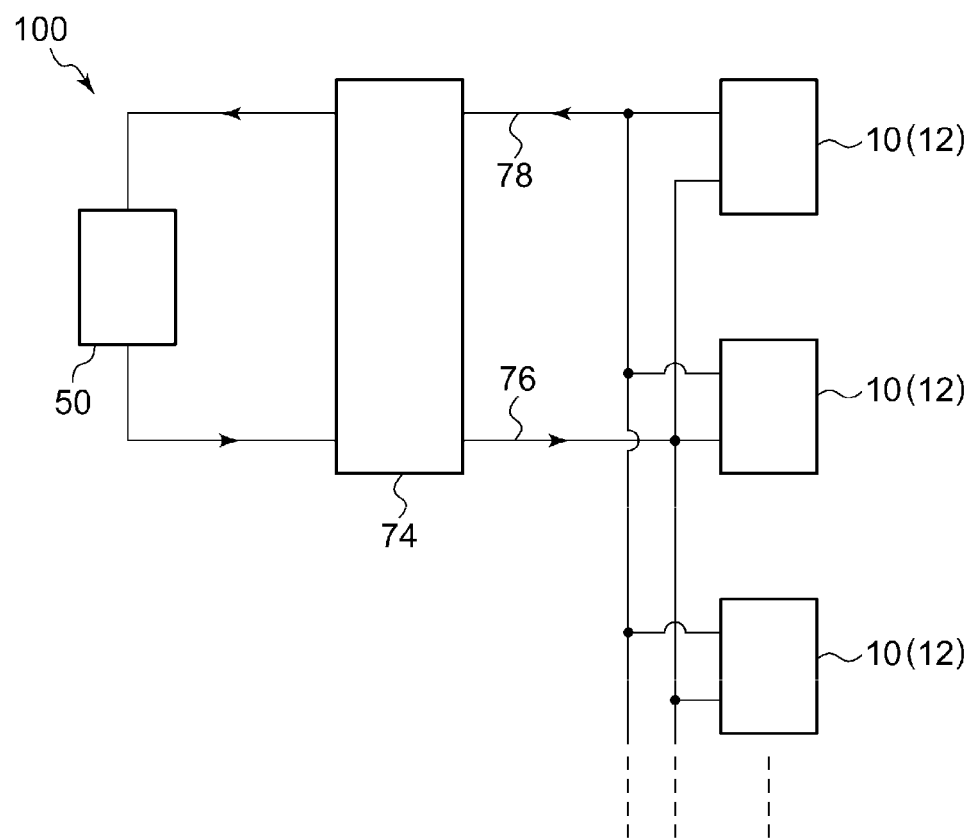
FIG. 9 is a schematic view of an overall configuration of a cryopump system according to yet another embodiment of the present invention.

In addition, the cryopump system 100 may include a plurality of cryopumps 10 as illustrated in FIG. 9. The plurality of cryopumps 10 is disposed in parallel with the compressor unit 50 and the gas volume adjuster 74. An effect of reducing electric power consumption by the adjustment to increase the gas volume increases in proportion to the number of the cryopumps 10 provided with one compressor unit 50. Hence, the present invention is preferred for the cryopump system 100 including the plurality of cryopumps 10.

In an embodiment, a cryogenic device including a refrigerator 12 instead of a cryopump 10 may be provided. It will be clear to those skilled in the art that the gas volume adjustment according to an embodiment of the present invention is applicable to a cryogenic system including such a cryogenic device.

It should be understood that the invention is not limited to the above-described embodiment, but may be modified into various forms on the basis of the spirit of the invention. Additionally, the modifications are included in the scope of the invention.

Priority is claimed to Japanese Patent Application No. 2012-050725, filed on Mar. 7, 2012, the entire content of which is incorporated herein by reference.

What is claimed is:

1. A cryopump system comprising:
   a cryopump comprising a cryopanel, a temperature sensor that measures a temperature of the cryopanel, a refrigerator that cools the cryopanel, a high pressure gas inlet that receives a working gas into the refrigerator, and a low pressure gas outlet that discharges the working gas from the refrigerator, the cryopump configured to perform a preparatory operation including a cooldown from a room temperature to a cryogenic temperature and to perform a vacuum pumping operation at the cryogenic temperature;
   a compressor unit comprising a compressor of the working gas, a low pressure gas inlet that receives the working gas into the compressor, and a high pressure gas outlet that discharges the working gas from the compressor;
   a gas line comprising a high pressure line connecting the high pressure gas outlet and the high pressure gas inlet and a low pressure line connecting the low pressure gas outlet and the low pressure gas inlet;
   a gas volume adjuster comprising a buffer tank, a gas replenishing channel that allows the working gas in the buffer tank to flow into the low pressure line, a gas collecting channel that allows the working gas in the high pressure line to flow into the buffer tank, and a channel selector comprising at least one control valve configured to select either the gas replenishing channel or the gas collecting channel; and
   a control device comprising
      a cryopump controller configured to decide a current operation state of the cryopump and to receive a temperature information representing the temperature measured by the temperature sensor and
      a compressor controller configured to control the compressor such that a differential pressure between the high pressure line and the low pressure line agrees with a given target value of the differential pressure, the given target value being used both in the cooldown and in the vacuum pumping operation, and communicably coupled to the cryopump controller to receive an input information from the cryopump controller representing at least one of the current operation state of the cryopump and the measured temperature, the compressor controller configured to control the at least one control valve to select the gas replenishing channel if the current operation state is the vacuum pumping operation or if the measured temperature is lower than a first threshold temperature and to select the gas collecting channel if the current operation state is the cooldown or if the measured temperature is higher than a second threshold temperature such that a quantity of the working gas in the gas line during the cooldown is reduced in comparison with that during the vacuum pumping operation.

2. The cryopump system according to claim 1, wherein the preparatory operation is a regeneration of the cryopump starting from a warming from the cryogenic temperature to the room temperature and ending with the cooldown, and wherein the compressor controller is configured to control the at least one control valve to select the gas collecting channel if the current operation state is the regeneration or if the measured temperature is higher than the second threshold temperature such that the quantity of the working gas in the gas line throughout the regeneration is reduced in comparison with that during the vacuum pumping operation.

3. The cryopump system according to claim 1, wherein the compressor controller is configured to control the at least one control valve to select the gas replenishing channel if the current operation state is the vacuum pumping operation and if the measured temperature is lower than the first threshold temperature such that the quantity of the working gas in the gas line is increased after the vacuum pumping operation starts in comparison with that during the cool down.

4. The cryopump system according to claim 1, wherein the compressor controller is configured to control the at least one control valve to select the gas collecting channel if the current operation state is the cooldown and if the measured temperature is higher than the second threshold temperature such that the quantity of the working gas in the gas line is reduced and, thereafter, selecting the gas replenishing channel if the current operation state is the cooldown and if the measured temperature is lower than the first threshold temperature such that the quantity of the working gas in the gas line is increased before a subsequent vacuum pumping operation starts in comparison with that during the cooldown.

5. The cryopump system according to claim 4, wherein the compressor controller is configured to control the at least one control valve such that, when the gas replenishing channel is selected, the working gas is replenished from the gas volume adjuster to the gas line in stages or continuously in conjunction with a temperature decrease of the cryopump.

6. The cryopump system according to claim 1, wherein the gas replenishing channel comprises a flow control valve to be controlled depending on the measured temperature.

7. The cryopump system according to claim 1, wherein the gas collecting channel comprises a flow control valve to be controlled depending on the measured temperature.

8. The cryopump system according to claim 1, wherein the first threshold temperature is set to a target cooling temperature of the cool down.

9. The cryopump system according to claim 1, wherein the second threshold temperature is a temperature of 30 K or less.

10. The cryopump system according to claim 1, wherein the compressor controller controls a rotational speed of the compressor such that the differential pressure agrees with the target value.

11. The cryopump system according to claim 1, wherein the gas volume adjuster adjusts the quantity of the working gas such that a high pressure of the compressor is maintained equal to or lower than an upper limit setting of the high pressure.

12. The cryopump system according to claim 1, wherein the compressor controller is configured to control the gas volume adjuster based on the input information from the cryopump controller representing the current operation state of the cryopump.

13. The cryopump system according to claim 1, wherein the cryopump controller is configured to control the cryopump such that the cryopump is operated at a first cooling rate during the vacuum pumping operation and the cryopump is operated at a second cooling rate greater than the first cooling rate during the cool down, the compressor controller configured to control the compressor so as to provide a pressure control for the gas line.

* * * * *